April 21, 1970          J. L. OLIVER          3,507,369
ADJUSTER FOR CAM BRAKE
Filed Dec. 28, 1967                                6 Sheets-Sheet 1
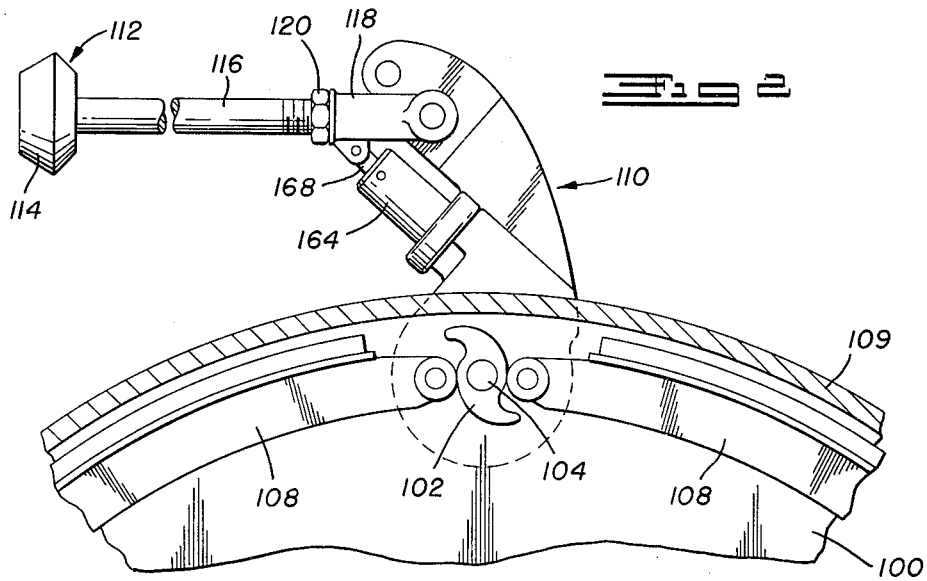
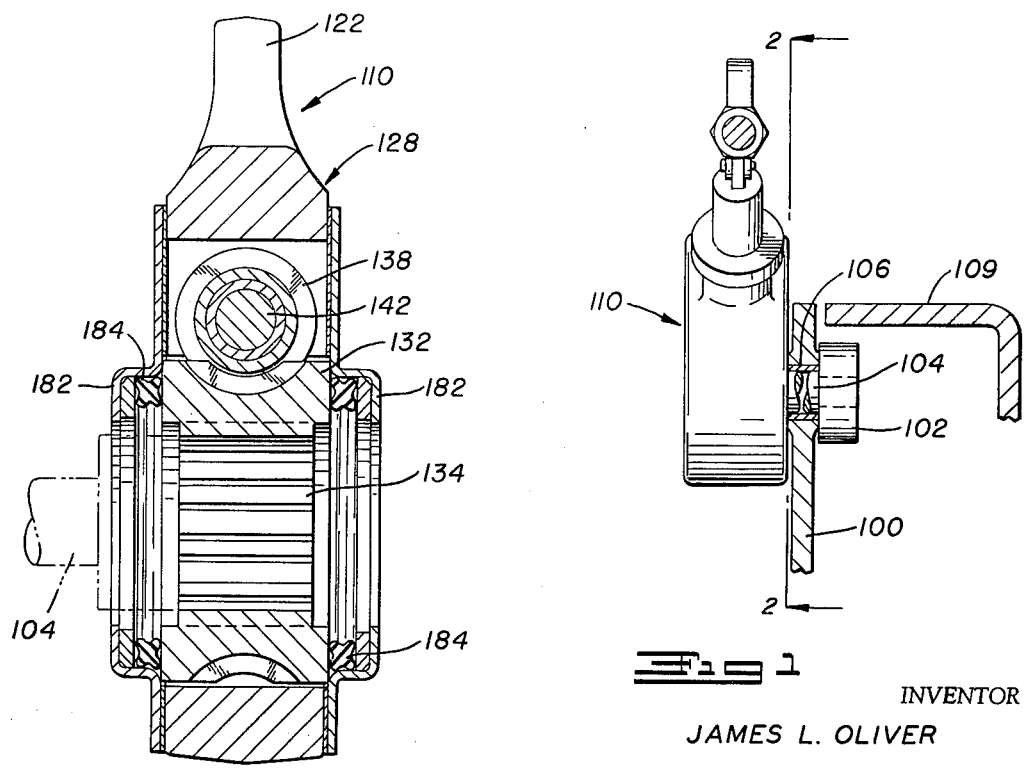
INVENTOR
JAMES L. OLIVER
BY *Teagno & Taddy*
ATTORNEY

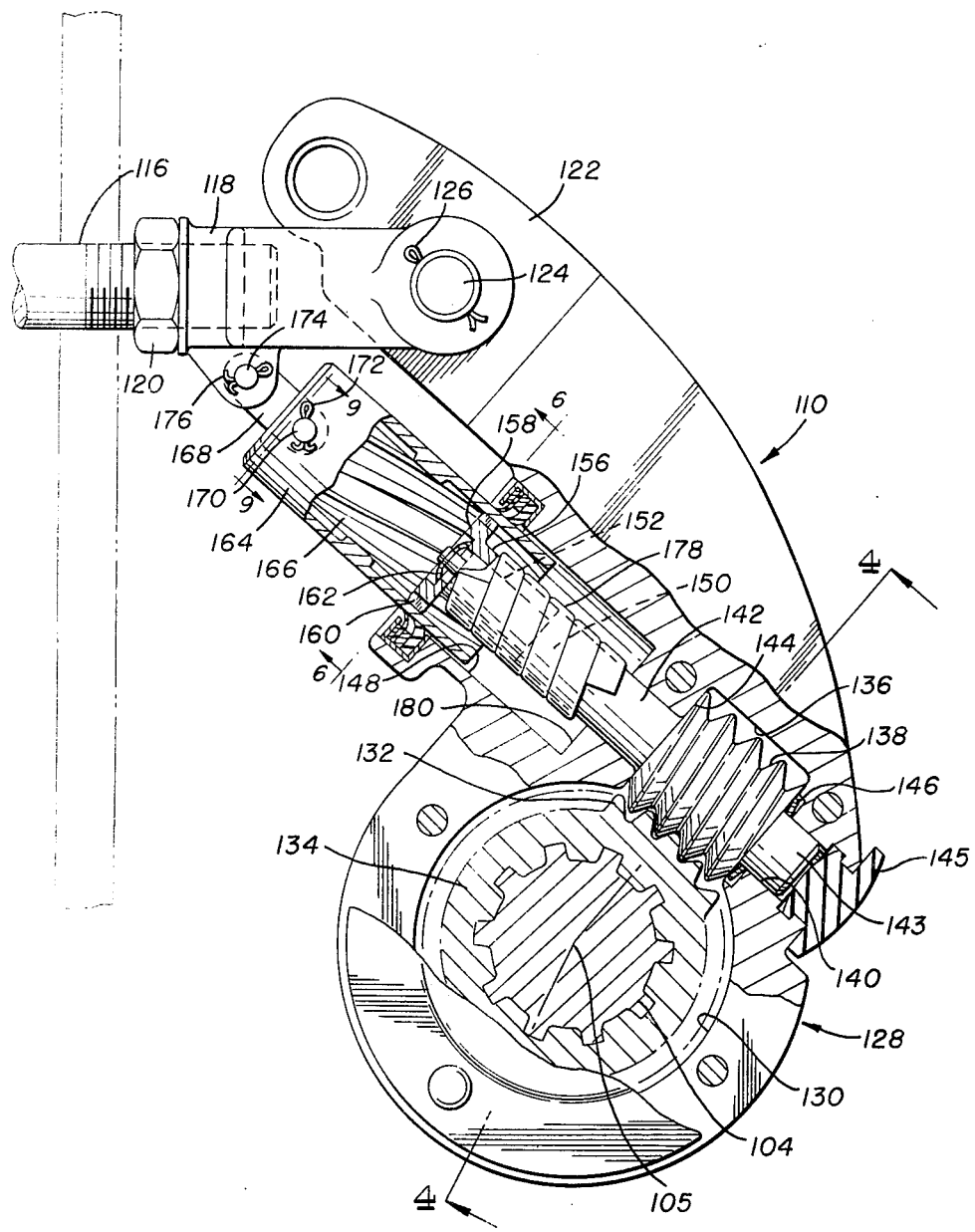

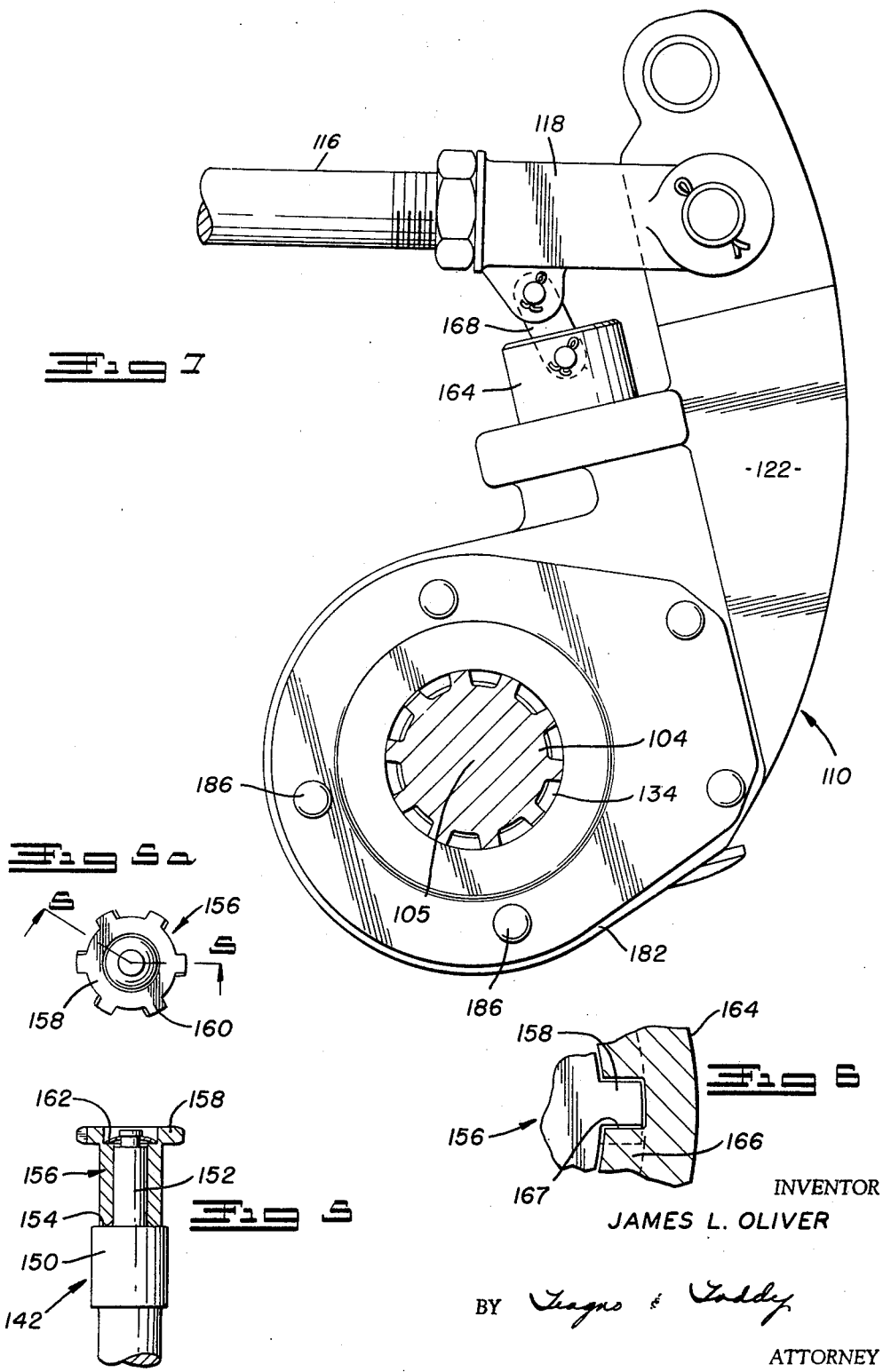

April 21, 1970
J. L. OLIVER
3,507,369
ADJUSTER FOR CAM BRAKE
Filed Dec. 28, 1967
6 Sheets-Sheet 4
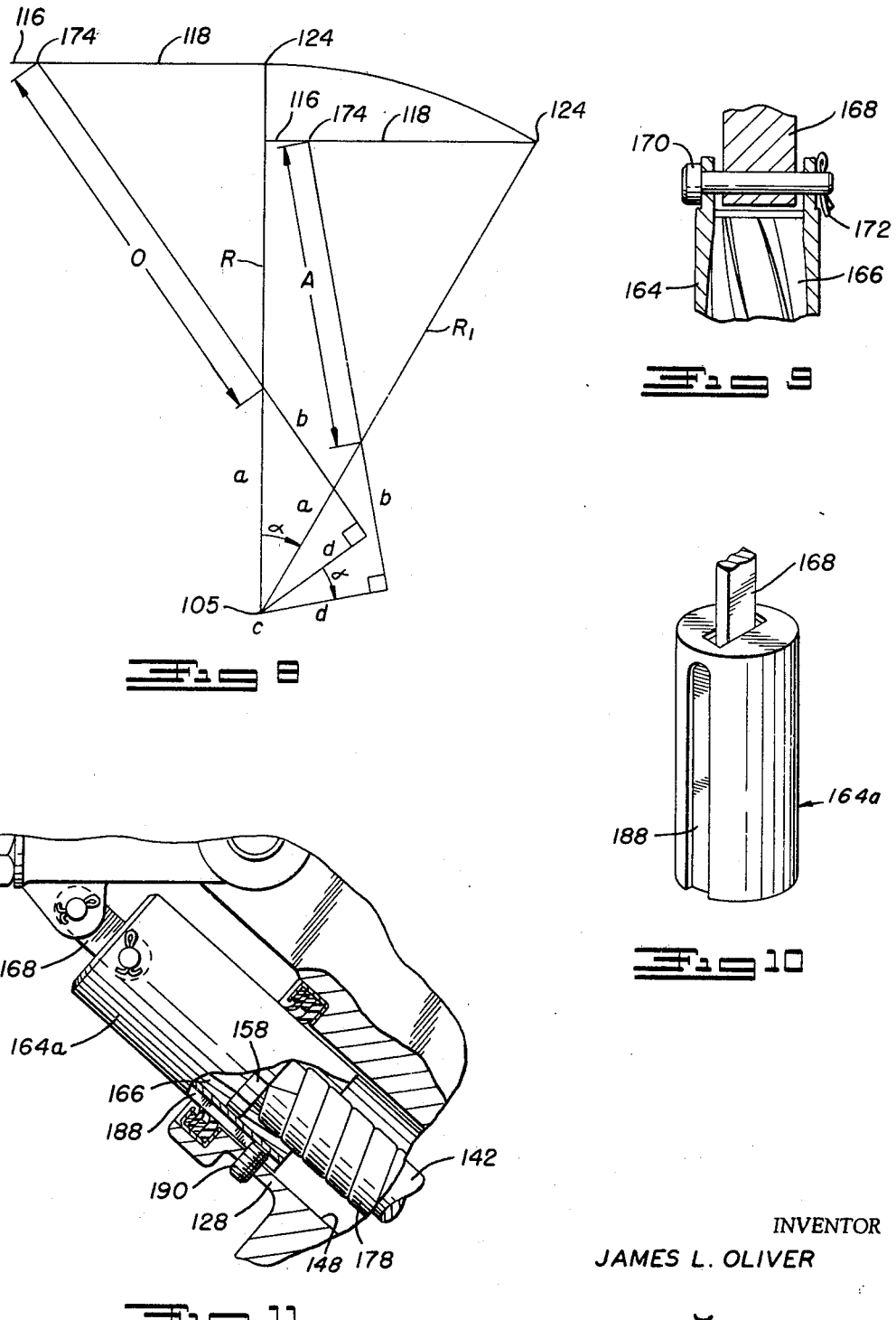
INVENTOR
JAMES L. OLIVER
BY *Fegro & Freely*
ATTORNEY

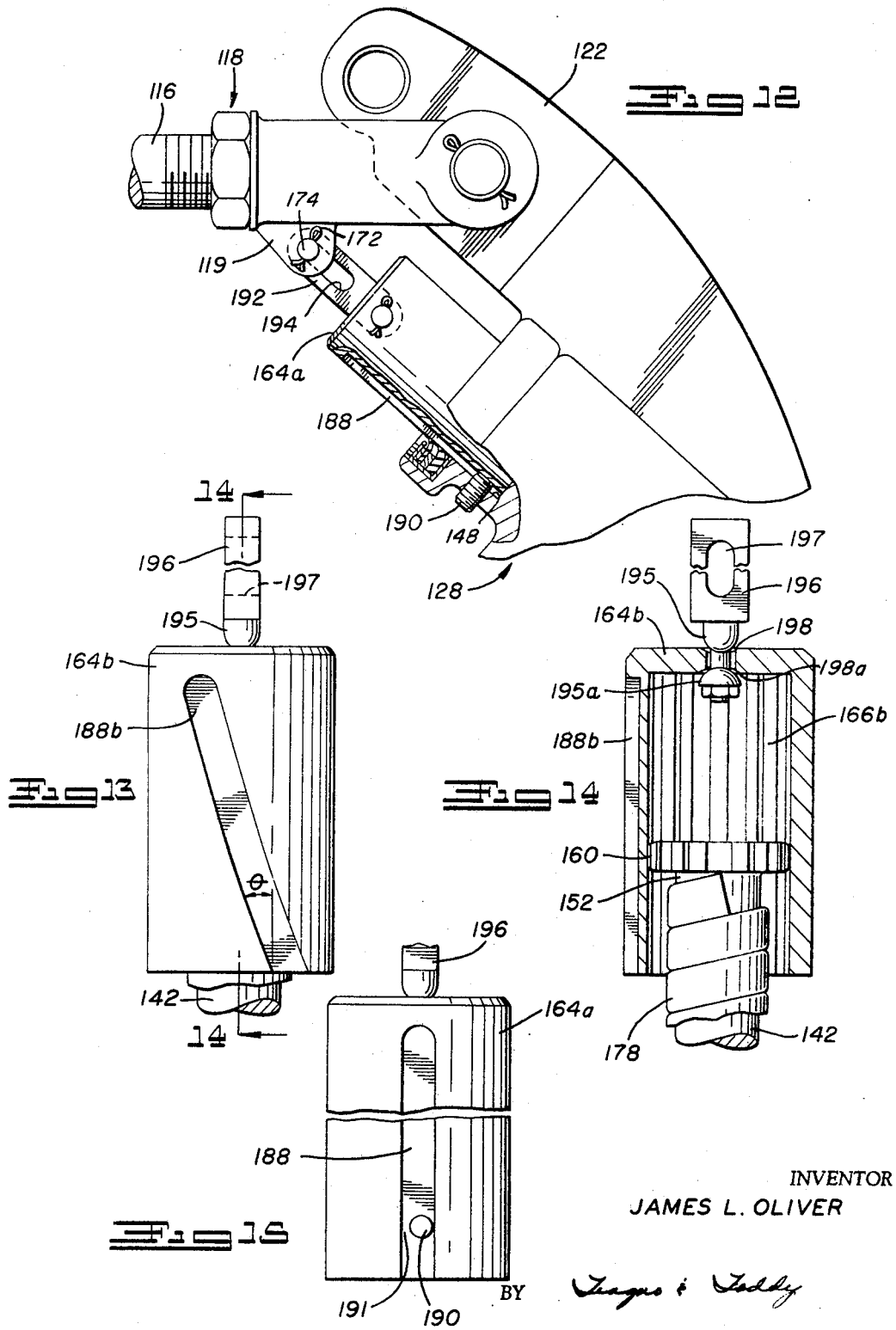

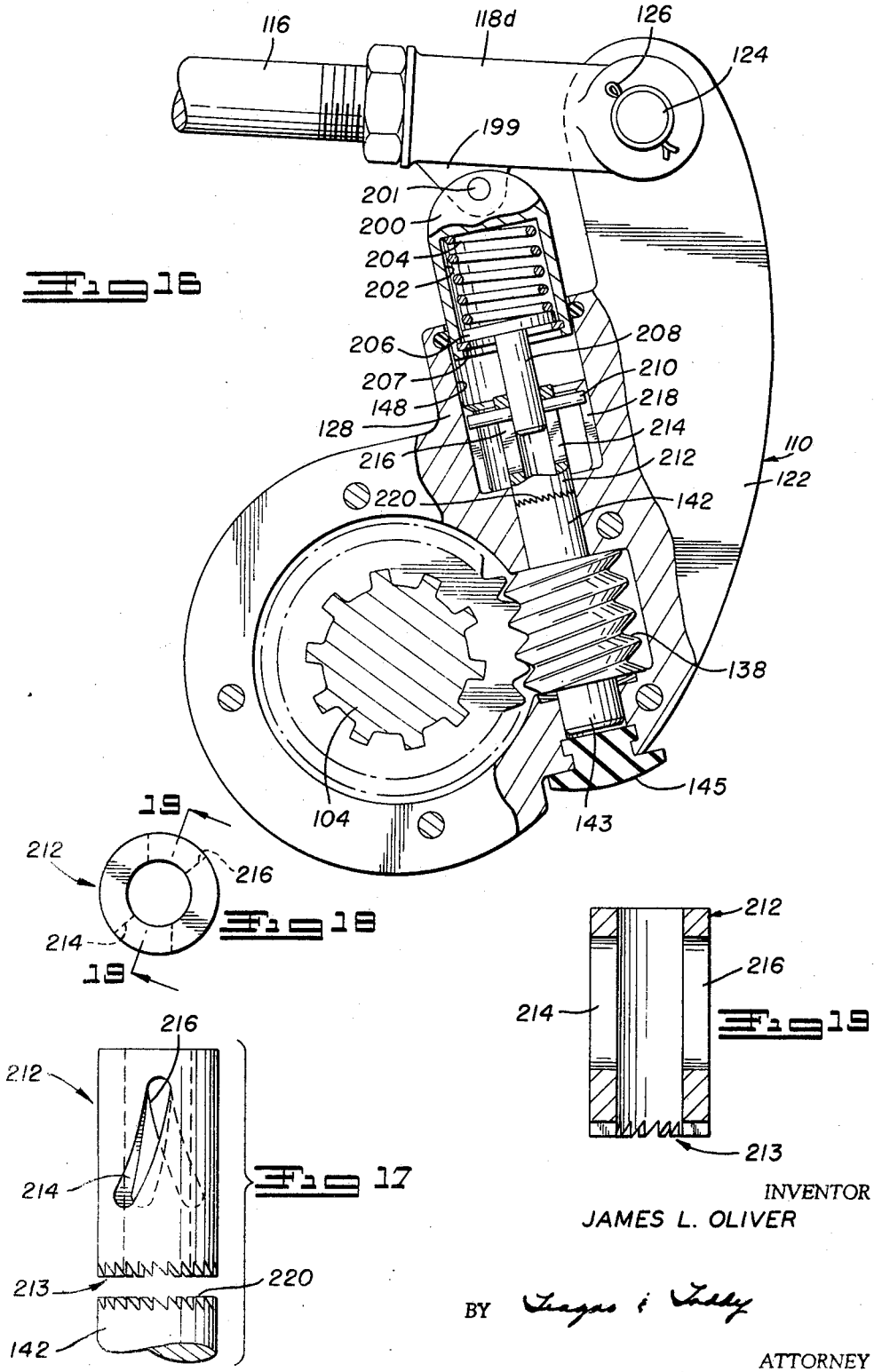

United States Patent Office 3,507,369
Patented Apr. 21, 1970

3,507,369
ADJUSTER FOR CAM BRAKE
James L. Oliver, Royal Oak, Mich., assignor to Eaton Yale & Towne Inc., Cleveland, Ohio, a corporation of Ohio
Filed Dec. 28, 1967, Ser. No. 694,134
Int. Cl. F16d 65/60, 51/50
U.S. Cl. 188—196                                19 Claims

ABSTRACT OF THE DISCLOSURE

An automatic adjuster for a cam actuated brake which is capable of differentiating that portion of the actuating motor stroke which is required to take up the clearance existing between the brake shoes and the brake drum in the rest position from that portion of the total stroke which is required as a result of elastic deformation of the brake drum, brake shoe linings, brake shoes, camshaft and air chamber mounting bracket.

A linkage assembly including a force or torque limited one-way drive mechanism is provided between the power source and the worm shaft of a cam actuated brake system for rotating the worm and thereby adjusting the brakes on the brake application stroke of the motor only so long as excessive clearance exists between the brake shoes and the brake drum.

BACKGROUND OF THE INVENTION

Field of the invention

This invention relates to an automatic adjuster for cam actuated brakes generally, and more particularly, to an automatic brake adjuster capable of differentiating between brake shoe wear and brake drum distortion in a cam actuated brake system.

Description of the prior art

Various types of automatic adjusters for cam actuated brake systems are known in the prior art. However, most known adjusters for cam actuated brake systems have been subject to the following limitations.

Most known adjusters for cam actuated brakes have made an adjustment of the camshaft and cam in response to the total angular rotation of the actuating cam. As is known, a portion of the cam rotation is utilized to move the brake shoes from a first position whereat a predetermined running clearance exists between the brake shoes and the brake drums to a second position whereat the brake shoes are in contact with the brake drums. A further substantial portion of the total cam rotation occurs after initial contact is made by the brake shoes with the brake drum. This further rotation of the cam results from a distortion or deformation of the brake drum brake lining, brake shoes, camshaft, and air chamber bracket. With the exception of a recently patented adjuster for a cam actuated brake system, automatic adjusters of the prior art have been unable to distinguish between the brake shoe movement from the position of normal running clearance to the position of initial contact with the brake drums and the further rotation of the cam which results in the deformation or distortion of the brake drum. The inability of the prior art adjusters for cam actuated brake systems to differentiate between movement of the brake shoes into contact with the brake drum and the continued movement of the brake shoes resulting in brake drum distortion has given rise to a problem in the prior art adjusters. The problem in the prior art adjusters being that an adjustment of the brake actuating cam was made in response to the total angular rotation of the cam. This total angular rotation of the cam does not reflect the need for an adjustment due to brake lining wear. Rather, a cam adjustment based on total angular rotation of the cam often resulted in an excessive adjustment of the brake shoes with respect to the brake drum with the result that the brake shoes would not be maintained with a proper predetermined running clearance between the brake shoes and the brake drum. This problem has contributed extensively to the lack of commercial success in any of the prior art brake adjusters.

As was indicated above, there has been a recently patented adjuster for a cam actuated brake system which is capable of differentiating between movement of the brake shoes from the position of running clearance to the position of initial contact with the brake drum and the continued rotation of the cam which results in distortion of the brake drum, brake linings, brake shoes, camshaft, and air chamber mounting bracket.

The recently patented adjuster is disclosed in U.S. Patent 3,351,163 issued to N. B. L. Sander et al. on Nov. 7, 1967. The invention of 3,351,163, however, differs significantly from the present invention and is further subject to many limitations not found in the present invention. The adjuster of 3,351,163 requires, at initial installation, a definite fixed positioning with respect to the power source in order that proper automatic adjustment will be made and maintained. This need for a fixed initial position causes an increase in the amount of skill necessary to install the adjuster initially and also decreases the flexibility of utilization of a single unit, that is, it would be necessary to design the adjuster for installation on a particular vehicle whereas the adjuster of the present invention does not require a particular initial installation position with respect to the power source and is, therefore, more universally adaptable.

A further limitation present in most prior art devices is that some connection with a stationary portion of the vehicle is necessary in order to obtain an adjustment of the cam shaft. The invention of the present case, however, is entirely self-contained and requires no external parts or portions for contacting any stationary portion of the vehicle.

SUMMARY OF THE INVENTION

The invention of the present case avoids the limitations of the prior art by sensing only brake shoe clearance caused by brake shoe wear as opposed to sensing total cam rotation, adjusts the cam and brake shoe position on the power or application stroke, eliminates the need for any parts or portions of the adjuster to be in contact with a stationary part of the vehicle to which the adjuster is adapted, and is insensitive to rest installation position in the brake assembly. Such contact with a stationary portion of the vehicle, and resulting sensitivity to installation position being necessary in all prior art clearance sensing adjusters for cam actuated brake systems.

The invention of the present case is a linkage assembly adapted to transmit linear motion received from a brake actuating power source into rotary camshift actuating motion, with the linkage assembly comprising a lever nonrotatably secured to the camshaft, a link member pivotally secured to the lever and adapted to be attached to and moved by a brake actuating power source, an adjusting worm and worm gear within a chamber defined by the lever for advancing the camshaft relative to an initial installation position of the lever, and a torque limiting one-way drive mechanism associated with the lever, link member, worm and worm gear assembly and responsive to relative pivotal movement between the pivotal member and lever, in one direction only, to advance the camshaft relative to the lever, during movement of the brake shoes from a position of running clearance to initial contact of the brake shoes with the brake drum, with continued brake shoe movement and distortion, after contact with the brake drum, not resulting in an adjustment of the brake shoes, cam and camshaft.

In accordance with the summary of the invention of the present case, it is, therefore, a primary object of the present invention to provide an adjuster for a cam actuated brake which distinguishes between brake shoe wear and total camshaft advancement and makes an adjustment for brake shoe wear on the power stroke of the brake actuating means.

It is a further object of the present invention to provide an improved adjuster as set forth in the preceding primary object which is self-contained and requires no modification of the vehicle to which it is to be adapted, the improved adjuster being substituted for the presently standard manual slack adjuster.

It is a further object of the present invention to provide an automatic adjuster for a cam actuated brake system which operates in accordance with the above objects and which is readily adaptable for use with commonly used brake system components, such as air motor actuators, actuator mounting brackets, camshafts, shoes and brake drums.

It is another object of the present invention to be able to use the same adjuster interchangeably with right or left handed brake assemblies.

It is another object of the present invention to provide an automatic adjuster for a cam actuated brake system whose clearance sensing and adjusting function is undisturbed by variations in the initial installation position.

BRIEF DESCRIPTION OF THE DRAWING

FIGURE 1 is a plan view of a cam actuated brake system with which the invention of the present case is particularly adapted for use.

FIGURE 2 is a side elevational view of the cam actuated brake system shown in FIGURE 1 taken along the line 2—2 of FIGURE 1.

FIGURE 3 is a sectional view illustrating one embodiment of the present invention.

FIGURE 4 is a sectional view taken along the line 4—4 of FIGURE 3.

FIGURE 5 is a sectional view taken along the line 5—5 of FIGURE 5a.

FIGURE 5a is a plan view of FIGURE 5.

FIGURE 6 is a sectional view taken along the line 6—6 of FIGURE 3.

FIGURE 7 shows the embodiment of FIGURE 3 in the operative position.

FIGURE 8 is a schematic illustration of the operation of the invention.

FIGURE 9 is a sectional view along line 9—9 of FIGURE 3.

FIGURE 10 shows a piston element for use in a modified embodiment of the present invention.

FIGURE 11 illustrates the piston element of FIGURE 10 in an operative environment.

FIGURE 12 shows another embodiment of the present invention utilizing the piston element of FIGURE 10.

FIGURE 13 illustrates a further modified piston element for use in the embodiment of FIGURE 12.

FIGURE 14 is a sectional view taken along the line 14—14 of FIGURE 13.

FIGURE 15 illustrates a particular feature of a modified piston member for use in FIGURE 12.

FIGURE 16 is a still further embodiment of the present invention.

FIGURE 17 illustrates a particular detail of construction of the embodiment of FIGURE 16.

FIGURE 18 is a top plan view of FIGURE 17.

FIGURE 19 is a sectional view of FIGURE 18 taken along the line 19—19.

DESCRIPTION OF THE PREFERRED EMBODIMENT

In FIGURE 1 there is shown a portion of a cam brake assembly of the type to which the invention of the present case is particularly adapted. The brake assembly comprises a brake support member 100 which is adapted to receive and support a brake shoe actuating means 102 which, in the case of FIGURES 1 and 2, is in the form of an S-cam actuator. The cam 102 is nonrotatably secured to a camshaft 104 which is supported for rotation in the brake support member 100 by suitable bearing means 106.

As is shown in FIGURE 2, a pair of outwardly expanding brake shoes 108 abut the shoe actuating means 102 in such a manner that upon rotation of the brake shoe actuating means 102, the brake shoes 108 are forced generally radially outwardly into engagement with a cooperating rotatable brake drum 109. Secured to the camshaft 104 is a linkage assembly 110 which is adapted to be driven through an angular displacement by means of a power source, such as an air motor 112.

As is well known in this type of vehicle, when the brakes are applied, a pressurized fluid is supplied from a central pressure source to a chamber of the air motor 112 and said pressurized fluid causes a diaphragm 114 to move an appropriate force transmitting member 116. The movement of the member 116 causes the brake actuating linkage assembly 110 to be pivoted about the axis 105 of the camshaft 104 with a resultant rotation of the brake shoe actuating means 102 and the outward displacement of the brake shoes 108 into engagement with the brake drum 109.

As is well known and understood in the art, braking of the vehicle by the engagement of the brake shoes 108 with the rotating brake drum 109 causes the lining which is secured to the brake shoes 108 to be worn, thereby increasing the clearance between the brake shoe 108 and the brake drum 109. Uncorrected, this clearance would require an increasing angular rotation of the brake shoe actuating means 102 in order to move the linings into engagement with the brake drum 109. The disadvantages of not correcting for the increasing clearance between the brake shoes 108 and the brake drum 109 are known and include loss of effective stroke in the air motor 112 which requires an increasing amount of pressurized fluid in order to actuate the brake shoes 108. A further disadvantage of allowing the increasing clearance between the brake shoe 108 and the brake drum 109 to go uncorrected is that the increased angular displacement of the brake shoe actuating means 102 necessary to cause the brake shoes 108 to contact the drum 109 requires an increased amount of time.

The invention of the present case lies in a mechanism intended to maintain the brake shoes 108 in a proper clearance condition relative to the rotating brake drums 109. The operation and features of the present invention may be more clearly and adequately defined with respect to FIGURE 3 of the drawing. As is shown in FIGURE 3, the pivotal linkage assembly 110 comprises a yoke or link member 118 which threadedly engages the linear movement transmitting arm 116. The position of the link 118 is fixed with respect to the linear movement transmitting arm 116 by a jam nut 120. The link 118 is pivotably secured to a lever 122 by means of a clevis pin 124 which in turn is secured in place by a cotter pin 126. The lever 122 is generally L-shaped in plan view and at one end 128 defines a housing and has a generally cylindrical bore 130 therethrough. Located within the bore 130 is a worm gear 132. The worm gear 132 has internal splines 134 and is adapted to cooperate with the exteriorly splined camshaft 104.

The housing 128 of the lever 122 further has a notch 136 therethrough with said notch 136 being open to the cylindrical bore 130. Located within the notch 136 and fixed against axial movement by the ends 144 thereof is a worm 138. Means, in the form of a Belleville spring 146 is provided to bias the worm 138 against one end 144. The worm 138 is in cooperating engagement with the worm gear 132 and is in driving relationship therewith. The housing 128 of the lever 122 further defines a generally cylindrical bore 140 adapted to receive and locate a worm shaft 142. The worm shaft 142 is nonrotatably secured to the worm 138 for driving engagement therewith. The worm 138 is fixedly attached to the worm shaft 142 by means of a press-fit or other suitable attachment means. The worm bore 140 supports the worm shaft 142 and worm 138 for rotation therein while the ends 144 of the notch 136 prevent axial movement of the worm 138 and worm shaft 142 while permitting rotation of the worm 138 therein.

The housing 128 of the lever 122 further defines an enlarged, generally cylindrical bore 148. As can be seen in FIGURES 3 and 5, the worm shaft 142 extends into cylindrical bore 148. An end 150 of the worm shaft 142 extending into the bore 148 has a necked-down portion 152 extending axially further into the cylindrical bore 148. Rotatably mounted on the necked-down portion 152 of the end 150 of the worm shaft 142 and abutting a shoulder 154 thereon is a generally tubular drive member 156. One end 158 of the tubular drive member 156 extends generally radially outwardly from the tubular section and has on the radial periphery thereof a plurality of generally radially extending tooth portions 160. The tubular drive member 156 is axially secured to the worm shaft 142 by means of a suitable fastener 162. Also, partially located within the cylindrical bore 148 and supported for axial movement therein is a generally cylindrical cup-shaped piston member 164 which contains a plurality of internal helical splines 166. The piston member 164 is connected to the link member 118 by means of a link 168, which link 168 is pinned to the piston member 164 by a clevis pin 170. The clevis pin 170 is secured in position by means of a cotter pin 172. The link 168 is likewise attached to the yoke 118 by a clevis pin 174. The clevis pin is secured in the assembly by a cotter pin 176.

Located within the cylindrical bore 148 of the lever 122 is a one-way drive mechanism 178 for transmitting rotary motion in one direction from the tubular drive member 156 to the worm shaft 142. In the embodiment shown, the one-way drive mechanism 178 is a helically wound coil spring clutch in wrapped relationship to the tubular drive member 156 and the end 150 of the worm shaft 142. The one-way drive mechanism 178 is located within the cylindrical bore 148 of the lever 122 and fixed against axial movement by an end 180 of the cylindrical bore 148 and the underside of the end 158 of the tubular drive member 156.

As can be seen in FIGURE 4, the housing 128 of the linkage assembly 110 is covered on each side with a cover plate 182. Located adjacent the worm gear 132 and held in place by the cover plate 182 is an annular seal 184 for preventing the contamination of the adjuster mechanism in the housing 128 by dirt and other contaminants entering from the atmosphere. The cover plates 182 are held in place on the lever 122 by means of a plurality of suitable fastening means 186, such as screws or rivets.

In operation, when the operator of the vehicle actuates the brake system, generally by depressing a pedal, pressurized fluid from a central fluid source is supplied to individual wheel air motors such as that shown at 112 in FIGURE 2. When pressurized fluid is supplied behind the diaphragm 114 of the fluid motor 112 the motion transmitting rod 116 which is attached at one end to the diaphragm 114 and at the other end to the linkage 110 is forced outwardly, thereby causing the linkage assembly 110 to be rotated through an arc. This partial rotation of the linkage assembly 110 causes a corresponding rotation of the camshaft 104 and the brake shoe actuating cam means 102. The oppositely disposed brake shoes 108 are forced by the rotation of the cam means 102 into engagement with the brake drum 109. When the linkage assembly 110 of the present invention is caused to rotate in a clockwise direction from a position shown in FIGURE 3, it can be seen that there is a shortening which occurs between the pivot point at the clevis pin 174 and any point on the tubular drive member 156. This shortening effect is schematically illustrated in FIGURE 8 of the drawing.

If the lever arm R is rotated through an angle represented as alpha to the position shown as $R_1$ while maintaining the motion transmitting arm 116 substantially horizontal, it can be seen that there is a substantial shortening of the distance from the pivot point 174 along the centerline of the worm 138 to the point of intersection with the lever arm $R_1$. This distance has been designated as O in the original position of the lever arm R and as A after rotation of the lever arm R through the angle alpha to the position $R_1$. It is the essence of this invention that the shortening effect occurring between the above-described two points is utilized to effect an adjustment of the brake shoe actuating cam 102 in the event that there exists an excess clearance between the brake shoes 108 and the brake drum 109.

In the linkage 110 of FIGURE 3, as the motion transmitting arm 116 is extended to the right and a clockwise rotation of the linkage 110 is begun, the piston member 164 begins to move, because of the above-described shortening effect, into the cylindrical bore 148 of the lever 122. Due to the internal helical splines 166 located in the piston member 164 and the mating engagement therewith by the teeth 160 of the tubular drive member 156, a partial rotational movement is imparted to the tubular drive member 156. This partial rotational movement of the tubular drive member 156 is transmitted by the one-way torque limiting drive mechanism 178, illustrated as a spring clutch, to the worm shaft 142 and thereon to the worm 138. This rotational movement of the worm 138 likewise imparts a lesser partial rotational movement to the worm gear 132. Since the worm gear 132 is nonrotatably secured to the camshaft 104, the camshaft and brake shoe actuating cam 102 secured thereto are likewise given a partial rotational movement with respect to the lever 122 in response to movement of the piston member 164 into the cylindrical bore 148.

It is to be noted that the linkage 168 between the link member 118 and the piston member 164 is required to take the torque reaction from the rotation of the tubular drive member 156 and must, therefore, be fixed against rotation. As has been indicated, the one-way torque limiting drive mechanism 178 permits the tubular drive member 156 to slip with respect to the worm shaft 142 on the return stroke of the linkage 110 to the left from the position shown in FIGURE 7 and until the piston member 164 is again located in the position shown in FIGURE 3, whereas the worm 138, worm gear 132, camshaft 104 and brake shoe actuating means 102 are retained in the now adjusted or partially adjusted position.

It can be seen, therefore, that during each application of the brakes and the resultant rotation of the linkage assembly 110 the piston member 164 will be forced into the cylindrical bore 148 with a resultant rotation imparted to the tubular drive member 156. However, it is an important aspect of this invention to note that the one-way drive mechanism 178 provides a torque limiting connection between the tubular drive member 156 and the worm shaft 142. That is, the movement of the piston member 164 into the chamber 148 will cause rotation of the tubular drive member 156. A corresponding rotation of the worm shaft 142 through the one-way drive mechanism 178 will occur only so long as the torque necessary to cause rotation of the worm shaft 142 is below the predetermined limit torque of the one-way drive mechanism. The torque transmitting capability of the torque limiting one-way drive mechanism 178 is sufficient to cause rotation of the worm shaft 142 so long as the brake shoes 108 remain out of contact with the brake drums.

It is important to recognize that once the brake shoes 108 are brought into contact with the brake drums the torque necessary to advance the cam means 102 rises with increased travel of the actuating member 112. The highly increased torque necessary to advance the cam means 102 beyond the point where the brake shoes 108 contact the brake drums logically follows from the fact that once brake shoe contact is made with the drum, further radially outward movement of the brake shoes 108 resulting from further rotation of the actuating member 102 results only in a distortion of the brake drum which distortion would, of course, require extremely high forces tending to clamp the worm 138 between the worm gear 132 and the housing 128 and thereby increasing the torque necessary to advance the worm shaft 142 above the torque transmitting capacity of the one-way drive mechanism 178. Therefore, the torque transmitting capacity of the one-way drive mechanism 178 has been limited to a value which is greater than that necessary to advance the brake shoe 108 against normally encountered frictional and brake shoe return spring forces but substantially less than the amount of torque necessary to advance the cam means 102 with respect to the lever 122 to cause a distortion of the brake drum. Therefore, it can be seen that once the brake shoes 108 have been brought to a position of proper clearance with respect to the brake drums, the brake shoes 108 will contact the brake drums within a short rotation of the cam 102 with a rapid increase in the torque necessary to advance the cam means 102, which increase in torque will raise the torque necessary to rotate the worm shaft 142 above the torque transmitting capacity of the one-way drive mechanism 178 and further rotation of the linkage assembly 110 as described above will result only in the slippage of the one-way drive mechanism 178 with respect to one or the other of the tubular drive members 152 or the worm shaft 142.

The provision of the torque limiting one-way drive mechanism 178 with a limited torque transmitting capacity is an extremely important feature of this invention as it allows for the adjustment of the cam means 102 on the brake application stroke and further allows the brake adjusting mechanism to sense brake lining clearance due to wear and make adjustments therefor while distinguishing that brake lining clearance from brake system distortion caused by continued rotation of the cam means 102 due to the continued extension of the motion transmitting arm 116 and the resultant continued rotation of the linkage assembly 110 and the camshaft 104.

It is, of course, recognized that it is necessary to maintain a predetermined fixed running clearance between the brake shoes 108 and the brake drum in order to allow free running of the vehicle wheels during non-braking operation of the vehicle.

It is recognized that frequent usage of the brake will result in increased temperature in the brake drum and brake shoes 108. This temperature rise will cause a well known thermal diametral expansion of both the brake drum and brake shoes 108, the expansion being greater in the drum. The brake adjuster is therefore designed to adjust only to a corresponding predetermined clearance. This clearance being sufficient to prevent drag of the brake when the brake drum and brake shoes 108 cool and contract to their original diameters. This predetermined running clearance is maintained in the invention of the present case by providing a predetermined amount of clearance or play between the teeth 160 of the tubular drive member 156 and the walls of the internal splines 166 of the piston member 164. The arrangement of the teeth 160 of the tubular drive member 156 and the mating engagement thereof with the internal splines 166 of the piston member 164 is more clearly shown in FIGURE 6 wherein the clearance between the teeth 160 of the tubular drive member 156 and the internal spline 166 of the piston member 164 is designated as 167.

FIGURE 7 shows the maximum rotational position of the linkage assembly 110 and the innermost position of the piston member 164 with respect to the cylindrical bore 148 of the lever 122. Upon return of the linkage assembly 110 from the position shown in FIGURE 7 to that shown in FIGURE 3, the above-described shortening of the piston member 164 with respect to the tubular drive member 156, is of course, reversed. During this reversal, the piston member 164 moves relative to the tubular drive member 156 and causes the tubular drive member 156 to be rotated in a direction opposite to that described above after reestablishing the predetermined running clearance.

The torque transmitting capacity of the torque limiting one-way drive mechanism 178 as the tubular drive member 156 returns from its advanced position corresponding to FIGURE 7 to the rest position of FIGURE 3 is as near zero as is practical in this reverse direction. It is possible to further prevent the tendency of the worm shaft 142 and worm 138 to rotate from an adjusted position during said return motion of the linkage assembly from the position of FIGURE 7 to the position of FIGURE 3 by the provision of a biasing means, such as a Belleville spring 146, in order to assure a resistive torque above the slip torque of the torque limiting one-way drive mechanism 178. It is recognized that during adjustment the dragging torque of the biasing means 147 must be subtracted from the torque produced by the torque limiting one-way drive mechanism to determine the torque available to drive the worm 138.

Further as is well known in worm and worm gear drive mechanisms, the efficiency of such gear sets is such that the worm gear cannot cause a rotation of the worm. Therefore, the forces of the brake shoe return spring acting on the cam means 102 cannot cause the worm 138 to be rotated from the adjusted position and the adjustment made during application stroke is thereby preserved.

As also can be seen in FIGURE 3, the worm shaft 142 is provided with a tool engageable end 143 to allow the manual adjustment of the camshaft position if desired. The worm shaft bore 142 is sealed against the entrance of contaminants by a plug member 145.

Further embodiments of the present invention are shown in FIGURES 11, 12, 13, 14 and 16. These embodiments although structurally different are conceptually similar to the above-described embodiment and further perform the same function as that described above.

FIGURE 10 illustrates a modified piston member 164a which could be used in the place of the piston 164 in the embodiment of FIGURE 3.

In FIGURE 10, the modified piston member 164a is provided with an axial groove 188. The modified piston member 164a is shown in an operative position in FIGURE 11. The purpose of the groove 188 in the piston member 164a is to react the torque generated by movement of the piston member 164a into the bore 148 of the housing 128. The linkage, in this embodiment, does not react the torque generated in making the adjustment.

With the assembly of FIGURE 11 it is possible to maintain a predetermined brake shoe running clearance by providing as in FIGURE 15 a clearance 191 between the torque reaction pin 190 and the walls of the groove 188.

FIGURE 12 illustrates the modified piston member 164a in an operating environment wherein a still further method of providing a predetermined brake shoe running clearance is disclosed. In FIGURE 12 the groove 188 in the piston member 164a is only nominally wider than the torque reaction pin 190 in the housing 128 and the internal splines 166b, FIGURE 14, are only nominally wider than the teeth 160 of the tubular drive member 156. The predetermined brake shoe running clearance is maintained in the embodiment of FIGURE 12 by providing a modified link member 192 for connecting the piston member 164a to the yoke member 118. The link member 192 is provided with an elongate slot 194 in one end thereof for receiving the clevis pin 174. In the embodiment of FIGURE 12, it can be seen that as the motion transmitting arm 116 is actuated and the lever 122 moved to the right with the resultant shortening of the piston 164a from the clevis pin 174 with respect to the housing 128, that the slot 194 provides a period of free movement of the clevis pin 174 with respect to the piston member 164a. At such time that the clevis pin 174 reaches the bottommost point of the slot 194 in the link 192, continued movement of the motion transmitting arm 116 and the lever 122 results in the above-described movement of the piston member 164a into the bore 148 of the housing 128 with the further resultant rotation of the worm shaft 142 and an advancement of the cam 102.

FIGURE 13 illustrates a further modified piston member 164b which may be used in the place of the piston member 164 or 164a. The piston member 164b comprises a generally cylindrical cup-shaped member having an arcuate groove 188b on the exterior surface thereof and extending along the exterior surface of the piston member 164b at an angle theta with respect to the axis thereof. If the piston member 164b is to be used in the assembly of FIGURE 12, it is necessary that a rotational connection be provided in the linkage 196 between the piston member 164b and the yoke 118. The rotation permitting coupling shown in FIGURES 13 and 14 comprises a linkage member 196 having a generally semi-spherical end portion 195 located thereon. This semi-spherical bearing surface 195 cooperates with a generally semi-spherical concave depression 198 on the outside of the piston member 164b. The linkage member 196 continues through an aperture in the top of the piston member 164b and a similar type of rotational bearing surface comprising a semi-spherical depression 198a in the underside of the piston member 164b and a generally spherical bearing member 195a attached to the linkage member 196.

As can be seen in FIGURE 14, with the angular groove 188b on the exterior surface of the piston member 164b, it is possible to obtain rotation of tubular drive member 152 through the use of axial splines 166b on the interior of the cup-shaped piston member 164b. In operation, as the piston member 164b is forced into the chamber 148 of the housing 128, the piston member 164b is caused to be partially rotated due to the reaction of the pin member 190 on the walls of the angular groove 188b. Since the teeth 160 of the tubular drive member 152 engage the axial splines 166b on the interior of the piston member 164b, the tubular drive member 152 is rotated with the piston member 164b. As is further shown in FIGURE 14, it is possible to obtain a predetermined brake shoe running clearance through the use of an elongate slot 197 in the linkage 196 similar to that shown in FIGURE 12. If an elongate slot in the linkage between the yoke member 118 and the piston member 164 is utilized, it is, of course, possible to maintain only nominal clearance between the teeth 160 of the tubular drive member 152 and also only a nominal clearance need be used between the groove 188b on the piston member 164b and the pin 190.

Still another embodiment of the present invention is shown in FIGURE 16 with various details of the embodiment of FIGURE 16 shown in FIGURES 17, 18 and 19. The embodiment of FIGURE 16 utilizes the shortening effect between the yoke member 118d and the lever 122 in a manner identical to that described in the earlier embodiments of the present invention when the motion transmitting arm member 116 is extended.

In FIGURE 16 the lever housing 128 is provided with a cylindrical bore 148 as in the earlier embodiments to receive a generally cylindrical cup-shaped piston member 200 for movement into and out of the bore 148 in response to movement of the motion transmitting arm 116 and the yoke member 118d. The mechanism for translating the shortening of the linkage assembly 110 into rotation of the camshaft 104 in FIGURE 16 comprises a generally cylindrical piston member 200 having a generally cylindrical bore 202 therein. The piston member 200 is pivotally pinned to the tabs 199 of the yoke member 118d by a clevis pin 201. Located within the bore 202 of the piston member 200 is a precompressed helically wound spring member 204. The spring member 204 is maintained within the bore 202 of the piston member 200 by a disc-shaped end 206 of a generally T-shaped member 208. The disc-shaped end 206 of the T-shaped member 208 is retained within the bore 202 of the piston 200 by a retaining ring 207 of a well known type. The generally cylindrical portion 208 extends axially into the bore 148 of housing 128 and comprises, further, a generally cylindrical pin member 210 extending through one end of the member 208 and fixed thereto. The housing 128 is provided with axially extending internal splines 218 into which the ends of the pin member 210 extend and by which rotation of the pin member 210 is prevented. Surrounding a portion of the member 208 is a tubular drive element 212 having a pair of oppositely inclined slots 214 and 216 located therein.

The tubular drive element 212 is shown in greater detail in FIGURES 17, 18 and 19.

It can be seen from FIGURE 17 that as the member 208 and the pin member 210 is moved axially into the bore 148 of the housing 128, the member 212 will be caused to rotate by the angularity of the respective slots 214 and 216. In FIGURE 17 it can be further seen that one end of the tubular drive element 212 is provided with axially extending teeth 213 around the periphery thereof. As can also be seen in FIGURE 17, the periphery of the worm shaft 142 is also provided with corresponding teeth 220 which are oppositely disposed with respect to the teeth 213 of the element 212. Thus, as the tubular drive element 212 is caused to rotate by the action of the respective grooves 214 and 216, the worm shaft 142 is caused to rotate by engagement of the teeth 213 with the teeth 220 of the worm shaft 142. It can be further seen that in an opposite direction of rotation of the tubular drive element 212 such as when the lever 122 is rotated in a counterclockwise direction and the piston member 200 is withdrawn from the bore 148, the teeth 213 and the teeth 220 are such as to allow the tubular drive element 212 to slip with respect to the worm shaft 142. The function of the internal splines 218 of the housing 128 is to react the torque generated by movement of the member 208 into the bore 148 of the housing 128 and the resultant rotation of the tubular drive element 212. In this embodiment, the predetermined brake shoe running clearance is determined by the tooth width of the ratchet teeth 213 and 220.

The torque limiting feature of the piston member 200 and associated parts results from the inclusion of the preloaded helically wound spring member 204 between the piston member 200 and the disc-shaped portion 206 of the cylindrical drive pin member 208. As the force transmitting arm 116 is moved to the right in FIGURE 16, there results the above-described shortening of the link member 118d with respect to the lever member 122. So long as the torque necessary to advance the worm 138 and worm shaft 142 is small such as when the brake shoes 108 are yet to engage the brake drums, the force due to shortening of the linkage is transmitted from the yoke member 118d through the piston 200 to the spring member 204 and on to the generally cylindrical drive pin member 208 with the resultant rotation of the tubular drive element 212 and the further resultant rotation in an advancing direction of the worm shaft 142, the worm 138, the worm gear 132 and the camshaft 104. When the brake shoes 108 contact the brake drum and the torque necessary to advance the worm 138 increases substantially, the further rotation of the worm 138 will be effectively stopped and further shortening of the linkage assembly 110 will result in a compression of the spring member 204 with no further rotation of the worm shaft 142.

When the motion transmitting arm 116 is moved to the left from the brake actuating to the position shown in FIGURE 16, the piston member 200 is retracted from the bore 148. Retraction of the piston member 200 results in a reverse rotation of the tubular drive member 212 and a slippage of the teeth 213 with respect to the teeth 220 on the worm shaft 142 and the advancement of the camshaft 104 and cam 102 is maintained.

From the foregoing description it can be recognized that I have made a significant advance in the state of the art of automatic adjusters for cam actuated brake systems and in which I claim a proprietary right.

What is claimed is:

1. In an automatic brake adjuster for a cam actuated braking system,
a lever,
a camshaft, and first adjustment means mounting said camshaft for rotatable adjustment relative to said lever, and means connecting said camshaft to the cam of the braking system,
second adjustment means mounted on said lever and engaging said first adjustment means to operate said first adjustment means and thereby adjust said camshaft relative to said lever,
a one-way torque limiting drive mechanism constantly connected to said second adjustment means,
a reciprocable member mounted on said lever,
connecting means connecting said one-way torque limiting drive mechanism to said reciprocable member so that movement of said reciprocable member in one direction during brake application actuates said one-way torque limiting drive mechanism and actuates said second adjustment means to adjust the cam to the torque limit of the one-way torque limiting drive mechanism, and
link means pivotally connected to said lever and to said reciprocable member so that pivotal movement of said link means on movement of said lever produces movement of said reciprocable member.

2. The invention of claim 1 wherein the one-way torque limiting drive mechanism limits adjustment of the camshaft to a point representing a predetermined brake application torque in the camshaft.

3. The invention of claim 1 further including means for maintaining a predetermined portion of the pivotal movement of said pivoted link means inoperable to move said first adjusting means.

4. An automatic brake adjusting mechanism for use on a vehicle having a cam actuated brake system including a reciprocable power source and a rotatably mounted shaft for oscillating a cam actuator in response to reciprocal motion imparted by said power source, said brake adjusting mechanism comprising:
a lever defining a housing and having an opening therethrough;
a worm gear rotatably mounted within said opening and adapted to be nonrotatably secured to the camshaft;
a shaft mounted worm rotatably mounted within said lever housing and in driving engagement with said worm gear;
a one-way drive mechanism located within said lever housing and drivingly engaging said worm shaft;
means associated with said one-way drive mechanism for imparting a rotary motion thereto; and
a link member pivotally connected to said lever and associated with said rotary motion imparting means for imparting a linear motion thereto in response to pivotal movement between said lever and said link to cause rotary motion of said one-way drive in one linear direction only.

5. The brake adjusting mechanism of claim 4 wherein the one-way drive mechanism comprises a torque limiting one-way drive mechanism.

6. The brake adjusting mechanism of claim 5 further comprising:
connecting means for connecting the link member to the rotary motion imparting means and said connecting means providing a fixed amount of free movement between said link and said rotary motion imparting means.

7. An automatic brake adjuster for a power actuated brake system comprising:
lever means having an opening therethrough and defining a housing having a bore therein;
a worm gear rotatably mounted in said opening;
a worm rotatably mounted in said opening in driving engagement with the worm gear;
a worm shaft nonrotatably secured to the worm, rotatably mounted in said lever housing, and having an end thereof extending into said bore in the lever housing;
a tubular drive member rotatably mounted on said end of the worm shaft and having a toothed head portion;
a one-way drive mechanism interconnecting the worm shaft and the tubular drive member;
a generally cylindrical cup-shaped piston member extending into said lever housing bore and axially movable therein, the internal surface of the piston member being helically splined, and said splines being in cooperating engagement with the toothed head portion of the tubular drive member; and
a link means pivotally connected to the lever means and associated with the piston member such that pivotal movement of the link means with respect to the lever means will result in movement of the piston member in the lever housing bore;
whereby movement of the piston member in one direction will cause rotation of the worm shaft, worm and worm gear.

8. The brake adjusting mechanism of claim 7 wherein the one-way drive mechanism is torque limiting in the direction of drive.

9. An automatic brake adjuster as described in claim 8 wherein the one-way drive mechanism comprises a helically wound coil spring clutch.

10. An automatic brake adjuster as described in claim 8 further comprising connecting means for connecting the piston member to the link means and for providing a fixed amount of free movement therebetween.

11. An automatic brake adjuster for a power actuated cam brake system comprising:
lever means having an opening therethrough and defining a housing having a bore therein;
a worm gear rotatably mounted in said opening;
a worm rotatably mounted in said opening in driving engagement with the worm gear;
a worm shaft nonrotatably secured to the worm, rotatably mounted in said lever housing, and having an end thereof extending into said bore in the lever housing;
a tubular drive member rotatably mounted on said end of the worm shaft and having a toothed head portion;
a one-way drive mechanism interconnecting the worm shaft and the tubular drive member;
a generally cylindrical cup-shaped piston member extending into said lever housing bore and axially movable therein, the internal surface of said piston member having an axially extending spline, said spline being in cooperating engagement with the toothed head portion of the tubular drive member, the external surface of the piston member being provided with a groove therein, said groove angularly displaced with respect to the axis of the piston member;
a torque reaction pin located in said lever housing and extending into said groove on the piston member; and a link means pivotally connected to the lever means and associated with the piston member such that pivotal movement of the link means with respect to the lever means will result in movement of the piston member in the lever housing bore;

whereby movement of the piston member in one direction will cause rotation of the worm shaft, worm and worm gear.

12. An automatic brake adjuster as described in claim 11 wherein the one-way drive mechanism is torque limiting in the direction of drive.

13. An automatic brake adjuster as described in claim 12 wherein the one-way drive mechanism comprises a helically wound coil spring clutch.

14. An automatic brake adjuster as described in claim 12 further comprising connecting means for connecting the piston member to the link means and for providing a fixed amount of free movement therebetween.

15. An automatic brake adjuster for a power actuated cam brake system comprising:
   a lever means having an opening therethrough and defining a housing having a bore therein;
   a worm gear rotatably mounted in said opening;
   a worm rotatably mounted in said opening in driving engagement with the worm gear;
   a worm shaft, nonrotatably secured to the worm, rotatably mounted in said lever housing and having an end thereof extending into said lever housing bore;
   a piston assembly extending into said lever housing bore and axially movable therein, said piston assembly including a generally cylindrical cup-shaped piston member, biasing means located within the piston member, a nonrotatably cylindrical member in engagement with the biasing means and extending axially into said lever housing bore beyond the piston member, and a tubular drive member having a helical slot therein;
   a one-way drive mechanism interconnecting the cylindrical member and said end of the worm shaft; and
   a link member pivotally connected to the lever means and associated with the piston assembly such that pivotal movement of the link means with respect to the lever means will result in movement of the piston assembly in the lever housing bore;

whereby movement of the piston assembly in one direction will cause rotation of the worm shaft, worm and worm gear.

16. In an automatic brake adjuster for a cam actuated braking system including a cam actuator mounted on a rotatable cam shaft for oscillation between a pair of brake shoes and the cam operable to actuate the brake shoes into contact with a brake drum on movement of the cam in the brake application direction,
   a cam shaft actuating lever,
   first adjustment means mounting said cam shaft for rotatable adjustment relative to said lever,
   second adjustment means engaging said first adjustment means to operate said first adjustment means and thereby adjust said cam shaft relative to said lever,
   a one-way force limiting drive means drivingly connected to said second adjustment means, and operable on movement of the cam in the brake application direction, and means for driving said one-way force limiting drive means in response to rotation of said cam shaft by said lever in said brake application direction.

17. The invention of claim 16 wherein the one-way force limiting drive mechanism limits adjustment of the cam shaft to a predetermined brake application torque in the cam shaft representing contact between the brake shoe and the brake drum.

18. The invention of claim 16 including means for maintaining a predetermined initial portion of the rotation of said cam shaft, by said lever in said brake application direction, free of adjustment by said second adjusting means to thereby provide a predetermined clearance between the brake shoes and the drum.

19. Automatic brake adjusting mechanism for a cam actuated braking system including a cam actuator mounted on a rotatable cam shaft for oscillation between a pair of brake shoes, the cam operable to actuate the brake shoes into contact with a brake drum on rotation of the cam in the brake application direction, and a reciprocating power source for driving the cam actuator,
   a cam shaft actuating lever adapted for rotary motion to actuate the cam shaft,
   a worm gear carried by said lever and fixed to the cam shaft,
   a worm engaging said worm gear and fixed to a rotatable worm shaft carried by said lever to adjust the worm and cam shaft relative to the lever, the worm shaft restrained against axial movement,
   a one-way force limiting drive mechanism drivingly engaging said worm shaft to adjustably rotate said worm shaft,
   linear drive means connected with said one-way force limiting drive mechanism for imparting rotary driving motion thereto in response to rotary motion of said cam shaft actuating lever in the brake application direction,
   a link member pivotally connected to said lever, between said lever and said reciprocating power source, and said link member connected to said linear drive means for imparting linear motion thereto in response to pivotal movement between said lever and said link to cause rotary driving motion of said one-way force limiting drive mechanism on movement of said cam in the brake application direction only,
   the one-way force limiting drive mechanism limiting adjustment of the cam shaft to a predetermined brake application torque in the cam shaft representing contact between the brake shoe and the brake drum, and
   means for maintaining a predetermined initial portion of the rotation of the cam shaft, by said lever in said brake application direction, free of adjustment by said worm to thereby provide a predetermined clearance between the brake shoes and the drum.

References Cited

UNITED STATES PATENTS 3,351,163  11/1967  Sander et al.

DUANE A. REGER, Primary Examiner

U.S. Cl. X.R.

188—79.5